(12) United States Patent  (10) Patent No.: US 7,456,973 B2
Steinbichler et al.  (45) Date of Patent: Nov. 25, 2008

(54) METHOD AND DEVICE FOR THE CONTOUR AND/OR DEFORMATION MEASUREMENT, PARTICULARLY THE INTERFERENCE MEASUREMENT, OF AN OBJECT

(75) Inventors: Hans Steinbichler, Neubeuern (DE); Roman Berger, Schnaitsee (DE); Thomas Mayer, Kolbermoor (DE)

(73) Assignee: Steinbichler Optotechnik GmbH, Neubeuern (DE)

( * ) Notice: Subject to any disclaimer, the term of this patent is extended or adjusted under 35 U.S.C. 154(b) by 189 days.

(21) Appl. No.: 10/833,243

(22) Filed: Apr. 27, 2004

(65) Prior Publication Data

US 2004/0212795 A1  Oct. 28, 2004

(30) Foreign Application Priority Data

Apr. 28, 2003 (DE) ................................ 103 19 099

(51) Int. Cl.
*G01B 9/021* (2006.01)
(52) U.S. Cl. ...................................... 356/457; 356/35.5
(58) Field of Classification Search ................ 356/35.5, 356/457, 458, 520; 73/800; 382/108, 141
See application file for complete search history.

(56) References Cited

U.S. PATENT DOCUMENTS

| 4,702,594 | A | 10/1987 | Grant |
| 6,417,916 | B1 * | 7/2002 | Dengler et al. ............. 356/35.5 |
| 6,674,531 | B2 * | 1/2004 | Mahner ....................... 356/457 |
| 6,717,681 | B1 * | 4/2004 | Bard et al. ................... 356/520 |
| 6,934,018 | B2 * | 8/2005 | Shaw et al. ............... 356/237.2 |
| 2001/0040682 | A1 * | 11/2001 | Lindsay et al. .............. 356/520 |
| 2002/0135751 | A1 * | 9/2002 | Steinbichler et al. ....... 356/35.5 |

FOREIGN PATENT DOCUMENTS

| DE | 2806845 | 9/1978 |
| DE | 19944314 | 4/2001 |
| DE | 10128334 | 8/2002 |
| EP | 1061332 | 12/2000 |

\* cited by examiner

*Primary Examiner*—Tarifur R Chowdhury
*Assistant Examiner*—Jonathan M Hansen
(74) *Attorney, Agent, or Firm*—Dilworth & Barrese LLP

(57) ABSTRACT

The invention serves for the contour measurement and/or deformation measurement of an object, particularly a tire or a structural component of a composite material. The object is irradiated with light, particularly structured light, that is emitted by a radiation source and consists, in particular, of coherent light or partially coherent light, especially laser light. The light reflected by the object is picked up by a camera with an imaging sensor. In order to improve the image quality, a first image is produced with a first adjustment of the camera and/or the radiation source which is adapted to a first image region (13). In addition, a second image is produced with a second adjustment of the camera and/or the radiation source which is adapted to a second image region (12). Both images are combined (FIG. 5).

31 Claims, 7 Drawing Sheets

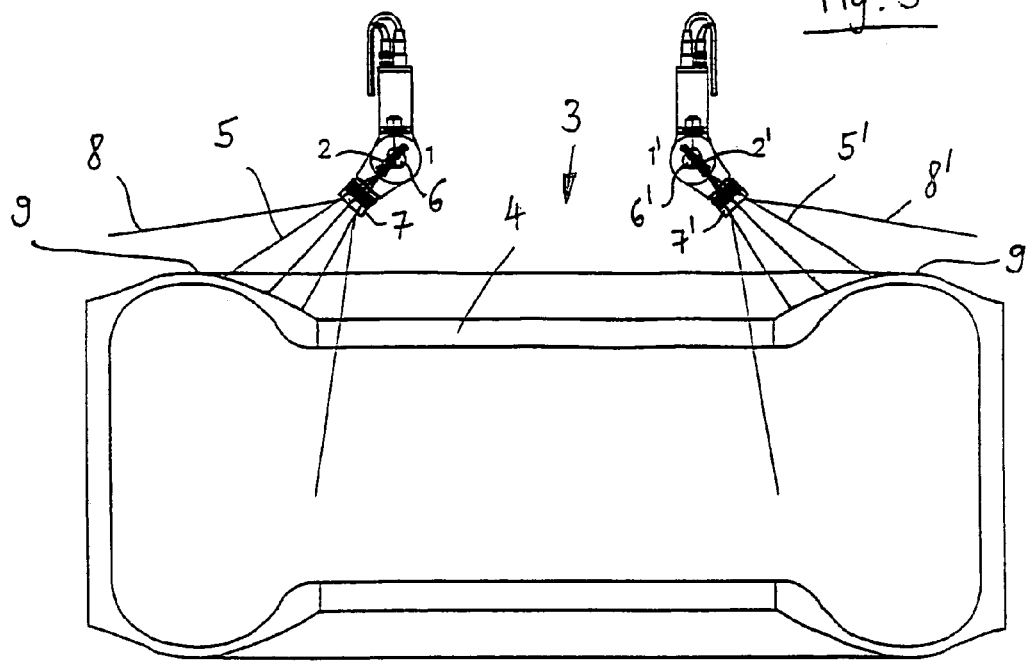

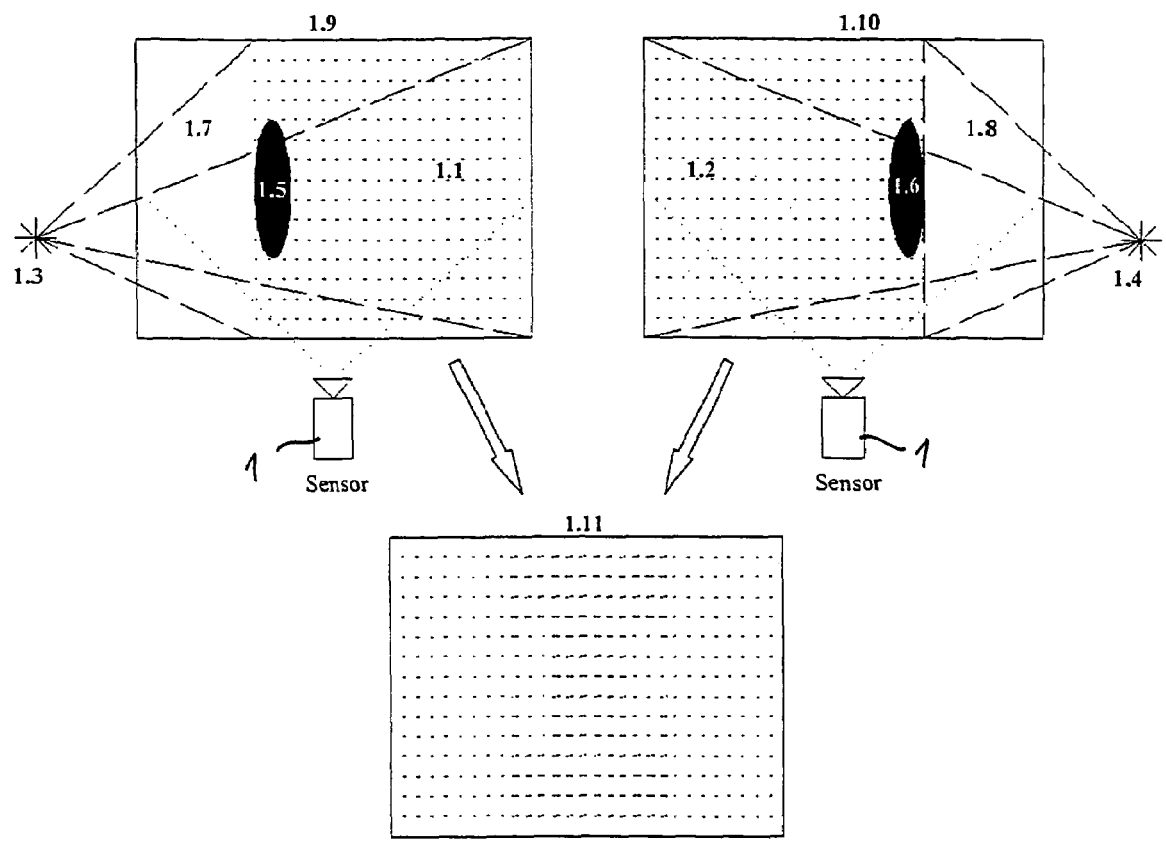

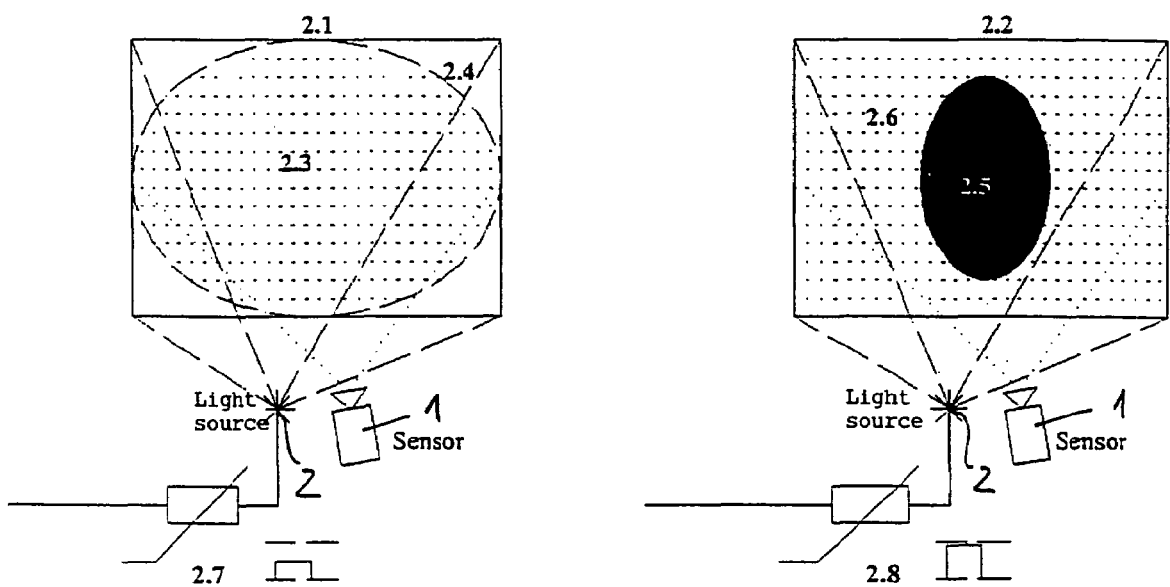

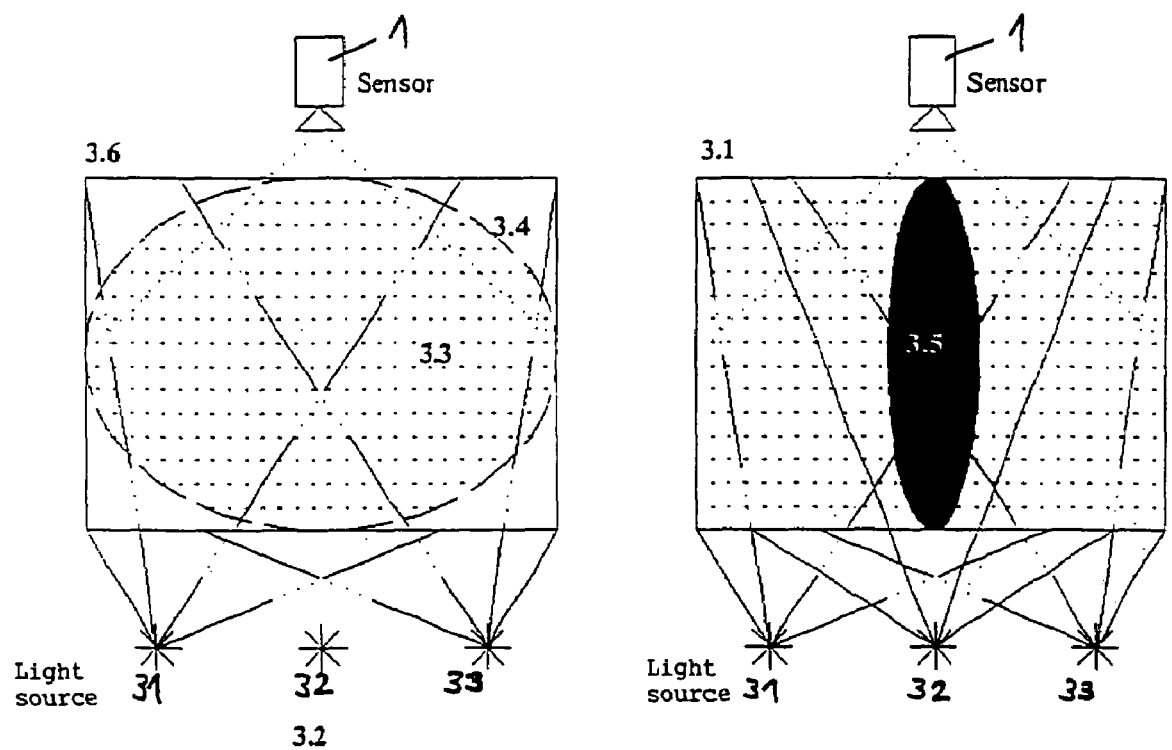

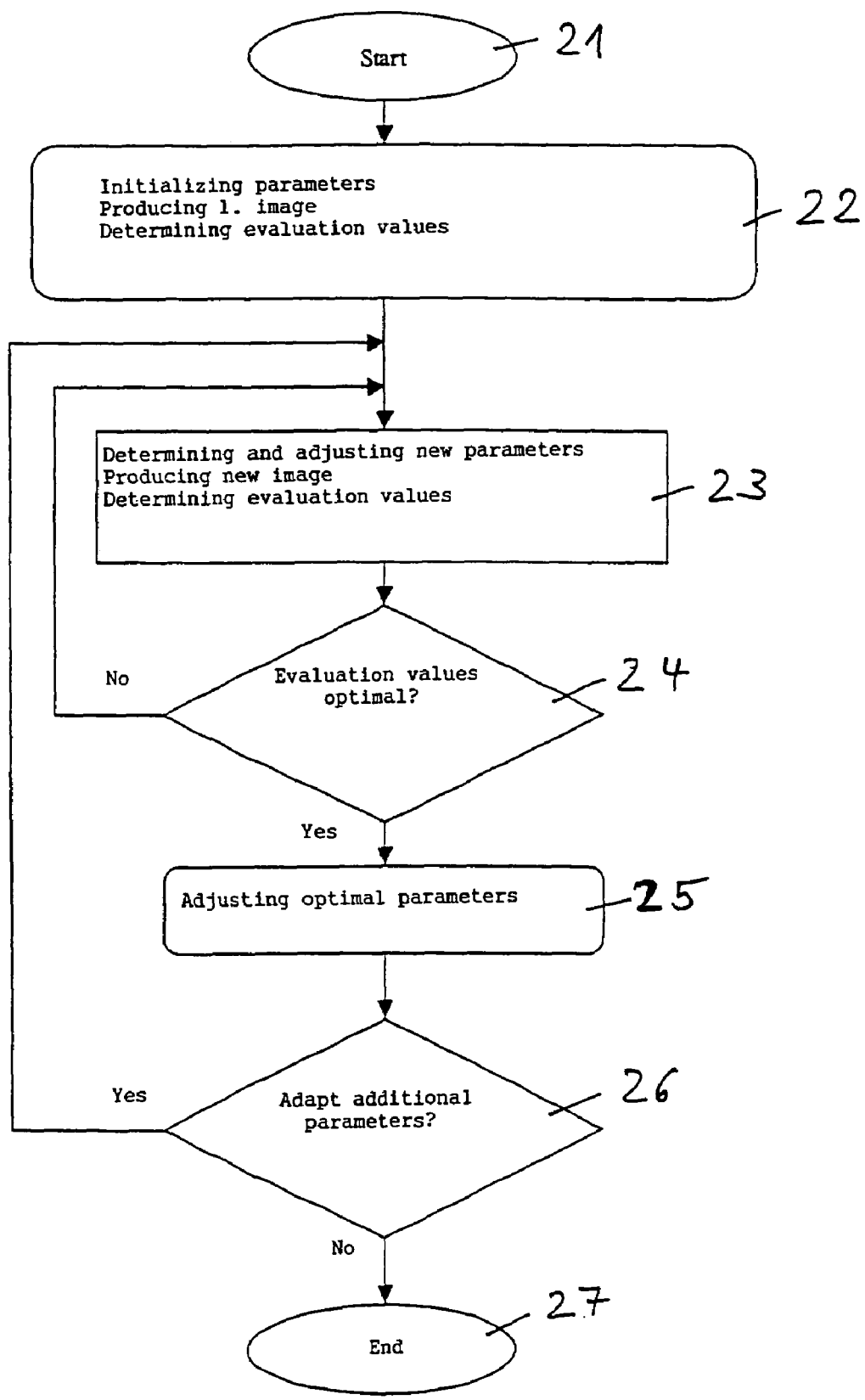

METHOD AND DEVICE FOR THE CONTOUR AND/OR DEFORMATION MEASUREMENT, PARTICULARLY THE INTERFERENCE MEASUREMENT, OF AN OBJECT

BACKGROUND OF THE INVENTION

The invention pertains to a method for the contour measurement and/or deformation measurement of an object, as well as to a device for implementing a method of this type. The invention specifically pertains to a method for the interference measurement of an object. The object may consist, in particular, of a tire or a component of a composite material.

The tire may consist of a passenger car tire, a truck tire, an aircraft tire or a tire of another means of transportation. The method is suitable, in particular, for examining a non-mounted tire, i.e., a tire that is not mounted on a wheel rim.

Composite materials are used in numerous technical fields. They consist of two or more individual materials that are connected to one another. Such composites may be realized in the form of rubber-metal composites, polymers that are reinforced with carbon fibers, foamed polymers, honeycomb structures and structural components. Composites are also used for semi-finished products, for example, pipes, rods and plates. Electronic circuit boards usually are realized with composite materials. In addition, composite materials are used for aircraft parts, in particular, for the wing, the wing flaps, the landing flaps, the fuselage, spoilers, tail fins, control surface casings, rudder units, overhead compartment doors and the interior. In the automotive industry, composite materials are used, e.g., for energy absorbers, hoods, roofs, doors, dashboards, seat shells and motor vehicle frames. Composites are also used for containers and tanks that hold gases and liquids. In addition, they are utilized for sporting goods, for example, skis, snowboards and bicycles.

In the method and the device, the object or its surface is irradiated with light emitted by a radiation source. The light may consist of unstructured light. Unstructured light may be utilized, in particular, in the field of photogrammetry. In this case, a contour measurement and/or deformation measurement can be carried out with two or more cameras that produce images of the object or its surface under a certain angle. However, it is also possible to utilize structured light. Structured light is used, for example, in Moire methods, Graycode methods or triangulation methods. The object or its surface can be observed with a camera when structured light is used. However, it is also possible to irradiate the object or its surface with coherent or partially coherent light, particularly laser light. This type of light makes it possible, in particular, to carry out interferometric methods.

The light reflected by the object may consist of scattered light and is picked up by a camera. The camera contains an imaging sensor, in particular, a planiform sensor. A CCD sensor is particularly suitable for this purpose.

In the method according to the invention, the geometry or deformation of objects is determined with the aid of speckle images or interferometric images, in particular, shearography methods, holography methods, ESPI methods or white-light interferometry methods. These methods can be carried out with CCD sensors or other imaging sensors, namely with or without a phase image evaluation by means of a temporal or spatial phase shift. One or more radiation sources can be used for illuminating the object, particularly laser light sources. However, it is also possible to utilize the illumination devices employed in white-light interferometric methods, for example, thermal sources or LEDs.

When carrying out the method according to the invention, one or more images are produced in one or more different states of deformation of the object, wherein an average value is subsequently formed from said images. The various states of deformation of the object can be realized, in particular, by respectively subjecting the object to a different ambient pressure.

This is possible and advantageous, in particular, with respect to tires that are not mounted on a wheel rim. The tire can be introduced into a low-pressure chamber or a high-pressure chamber. One of the states of deformation is reached at an existing or deviating negative pressure or positive pressure, at which air enclosed in defective spots of the tire expands or contracts and produces local deformations of the tire that subsequently can be measured and detected.

The same method also can be carried out with other objects. In addition, it is possible to provide a low-pressure chamber or a high-pressure chamber that is composed of a plate of a transparent material and sealed relative to the object by means of a peripheral seal. A negative pressure or positive pressure can be adjusted in the sealed region between the object and the plate such that air inclusions are expanded or contracted. This causes corresponding deformations to occur at these defective spots of the composite material, and these deformations can be observed through the plate.

The various states of deformation of the object, however, can also be realized by subjecting the object to different temperatures, for example, heat that is generated, in particular, by means of radiation. This is particularly advantageous with components consisting of a composite material.

A differential deformation and/or its gradient can be calculated from different state images that respectively represent different states of deformation. The light source or light sources and the camera may be realized in the form of one unit that represents a measuring head.

A device for testing tires is known from DE 199 44 314 A1. This device comprises a positioning apparatus for the tire to be tested and a test apparatus, particularly a laser test apparatus. The test apparatus comprise several measuring heads, particularly laser measuring heads.

A method for illuminating objects for interferometric speckle shearography methods is known from DE 101 28 334. In this case, the object surface is simultaneously illuminated by one or more respectively coherent, dilated or planiform radiation sources from several illuminating directions with different sensitivity vectors. The illuminated partial regions of the object section to be examined may overlap one another completely or partially such that a uniform illumination can be achieved. The angle of incidence of the light beams emitted by the illumination source at the respective points on the surface of the object section to be examined can be chosen such that the respectively corresponding ideal angles of reflection are, referred to the local surface normal, not directly oriented into the imaging plane of the sensor and direct radiations are prevented.

EP 1 061 332 A2 discloses an electronic shearography method that is used for testing tires. In order to achieve an improved presentation of the shearography images, the different images are stored with a predetermined frequency and then displayed in the form of a sequential series. In this case, it is possible to display several image sequences that show different regions of the test object simultaneously.

U.S. Pat. No. 4,707,594 describes a method for testing tires, in which a tire that is not mounted on a wheel rim is introduced into a low-pressure chamber. The tire is tested by means of a holography method or a shearography method in this case. The tire is subjected to a sudden pressure change such that its surface progressively creeps for a comparatively long time. A series of successive images is produced during this time.

DE 28 06 845 C2 discloses a method for carrying out an interferometric examination of an object, in which an imaging system produces a first and a second image of the examined object that is illuminated with coherent light on a photographic medium in two different object states.

When carrying out the initially described method, it may occur that the dynamics of the sensor are not sufficiently high for obtaining sensible measuring values in the dark and in the bright image regions, particularly when examining uncooperative objects with dark and/or highly reflective surfaces. This problem may arise, in particular, when examining very shiny tires or composite materials.

SUMMARY OF THE INVENTION

The invention is based on the objective of improving the image quality in a method and a device of the initially described type.

According to the invention, this objective is attained in a method of the initially described type with the characteristics herein. A first image is produced with a first adjustment that is adapted to a first image region, and a second image is produced with a second adjustment that is adapted to a second image region. The two images are then combined. The adjustments may be carried out on the camera, particularly the imaging sensor and/or the lens system, especially by varying the amplification, the diaphragm and/or the shutter speed and/or one or more additional camera parameters. Alternatively or additionally, the adjustments may also be carried out on the radiation source, particularly by increasing or decreasing the number of radiation sources, by changing the luminous intensity of the radiation source(s) and/or the direction in which the light is emitted by the radiation source(s) and/or by varying one or more other radiation source parameters.

The adjustments preferably are optimized for the respective image region. For example, a high amplification value can be adjusted for a dark image region in order to obtain an optimal input signal for the sensor. Accordingly, a low amplification value can be chosen, if so required, in connection with an additionally reduced exposure time for a highly reflective and consequently very bright image region.

In order to broaden the dynamics of the imaging sensor, two or more images are combined. This also makes it possible to measure overexposed or underexposed regions of the object. Various options may be considered for producing the individual images on the sensor with different intensities. The different intensities on the sensor that are adapted to the respective image regions can be achieved by changing the camera parameters, particularly of the sensor and/or the lens system, and/or by changing the radiation source parameters.

If so required, the first and the second image may also be supplemented with a third and/or additional images produced with respectively different adjustments that are adapted to the corresponding image regions.

The two images and, if applicable, one or more additional images can be combined or assembled in such a way that they fill out the entire image region. If two images suffice, the first image may cover one part of the entire image region and the second image may cover the remaining part of the entire image region.

Advantageous additional developments are described herein.

The combination of the images may be realized by averaging the information per pixel, wherein the averaging is preferably carried out based on a quality criterion. The quality criterion may consist of the calculable contrast image.

Another advantageous additional development is characterized in that several images are respectively produced with the first adjustment and the second adjustment and, if applicable, one or more additional adjustments. These images may be produced alternately and/or successively. It is possible, in particular, to produce a first image with the first adjustment, a first image with a second adjustment and, if applicable, one or more first images with one or more additional adjustments, and to subsequently produce a second image with the first adjustment, a second image with the second adjustment and, if applicable, one or more second images with one or more additional adjustments. Analogously, it is possible to produce one or more images with the first adjustment and the second adjustment and, if applicable, one or more additional adjustments.

However, it is also possible to produce a first and a second image and, if applicable, one more additional images with the first adjustment, and to subsequently produce a first and a second image and, if applicable, one or more additional images with the second adjustment. Analogously, it is possible to produce additional images with one or more additional adjustments.

An average value can be formed from a few or all images produced with the first and/or second and/or additional adjustments.

Another advantageous additional development is characterized in that the method is carried out in a first state of the object and subsequently in a second state of the object, in which the object is deformed in comparison with the first state. If so required, the method may also be carried out in one or more additionally deformed states of the object.

According to another advantageous additional development, the difference is formed between the images produced in the different states of the object. This difference can be calculated, namely before or after combining the first and the second image.

It is advantageous that the irradiating direction differs from the exposure direction.

One or more adjustments of the camera and/or the radiation source can be determined manually.

However, it is advantageous in many instances to determine one or more adjustments of the camera and/or the radiation source with the aid of an optimizing algorithm. The adjustments can be determined automatically in this case.

Another advantageous additional development is characterized in that one or more adjustments of the camera and/or the radiation source are determined by means of iterative changes. This method may be carried out manually or automatically. In this case, default values can be defined for the quality of the images in the various image regions. If the adjustments are changed iteratively, different images are produced and evaluated with respect to different default values until an optimum is reached. This method may be carried out in such a way that an evaluation value for an image is determined and compared with the default value, wherein one or more adjustments are then changed iteratively until the evaluation value largely corresponds to the default value. The method can be carried out with several evaluation values and several default values. In this method, it is possible to change different adjustments of the camera and/or the radiation source simultaneously. It is advantageous in many instances to change an adjustment of the camera and/or the radiation source first and then to change one or more other adjustments. The adjustments of the camera and/or the radiation source are successively optimized in this fashion.

According to another advantageous additional development, it is possible to cycle all possible values of one or more or all adjustments of the camera and/or the radiation source systematically in order to obtain the optimal adjustment values in this fashion. However, it is more sensible in many instances to determine the respectively next adjusting value based on the evaluation value(s) determined for each individual image and the comparison with the default value(s) in order to obtain the optimal adjustment or the optimal adjustments as quickly as possible. Optimizing algorithms may be utilized for this purpose.

According to another advantageous additional development, the object is illuminated from different directions.

It is advantageous to illuminate the object with different luminous intensities.

According to another advantageous additional development, the object is illuminated with a different number of light sources.

The objective of the invention with respect to a device of the initially described type is attained with the characteristics herein. The device for carrying out an interferometric measurement of an object, particularly a tire, comprises a radiation source for irradiating the object with coherent light, particularly laser light, and a camera with an imaging sensor for picking up the light reflected by the object. It also comprises a device for producing a first image with a first adjustment of the camera and/or the radiation source which is adapted to a first image region and for producing a second image with a second adjustment of the camera and/or the radiation source which is adapted to a second image region, as well as a device for combining both images.

Advantageous additional developments of the device according to the invention are disclosed herein.

BRIEF DESCRIPTION OF THE DRAWINGS

Embodiments of the invention are illustrated in the enclosed figures and described in greater detail below. The figures show:

FIG. 3, a modified embodiment with two measuring heads of the type illustrated in FIG. 1;

FIG. 4, a modified embodiment with two measuring heads of the type illustrated in FIG. 2;

FIG. 8, a region of a structural component to be examined, wherein the structural component consists of a composite material and is irradiated from different directions;

FIG. 9, a region of a structural component to be examined, wherein the structural component consists of a composite material and is illuminated with different luminous intensities;

FIG. 10, a region of a structural component to be examined, wherein the structural component consists of a composite material and is illuminated with a different number of light sources, and FIG. 11, a flowchart for automatically determining the parameters of the camera adjustments and/or radiation source adjustments with the aid of an optimizing algorithm.

DESCRIPTION OF THE PREFERRED EMBODIMENTS

Figure 1:
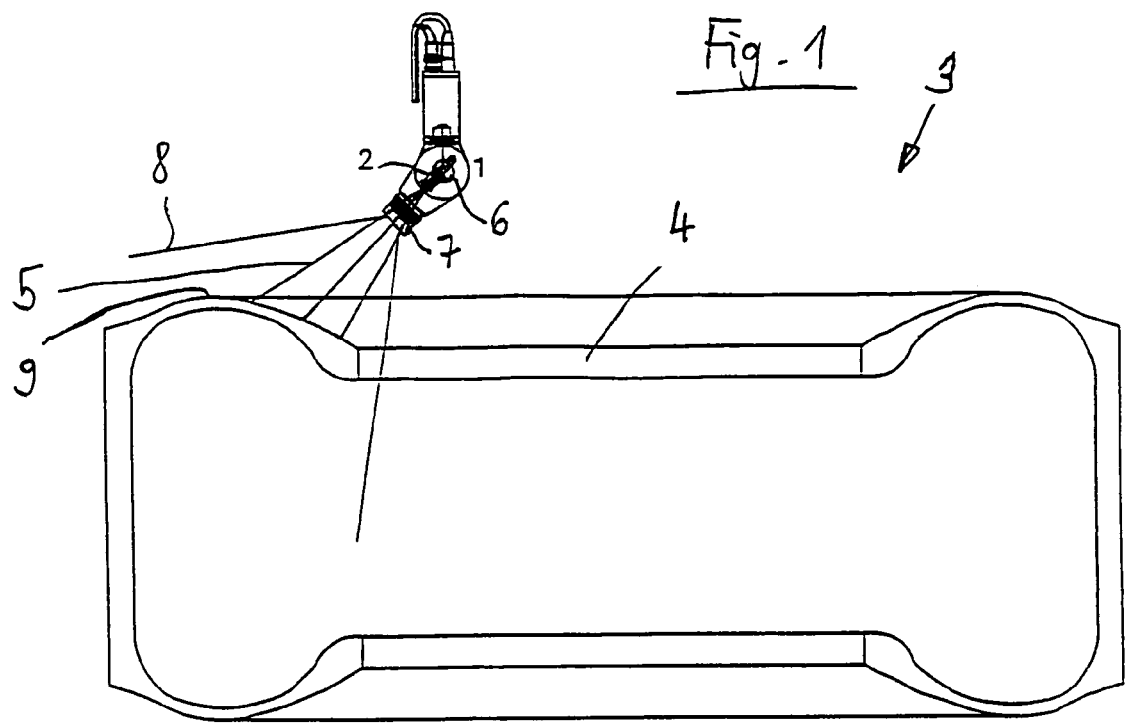
FIG. 1, a side view of a tire and a measuring head.

FIG. 1 shows part of the tire testing device (not illustrated in the figure), in which a non-mounted tire 3 (i.e., a tire without the wheel rim) lies on a horizontal support (not illustrated in the figure). A measuring head 1 is arranged above the tire 3, namely in the region that lies above the opening 4 of the tire 3. The measuring head 1 comprises a laser light source 2 with a radiation cone 5 and a camera that contains a CCD sensor 6 and a lens system 7 with an exposure cone 8. Part of the lateral surface 9 of the tire 3 is irradiated with the laser light emitted by the laser light source 2. The light reflected by the lateral surface 9 of the tire 3 is picked up by the CCD sensor 6.

The tire can be turned about its center axis in the tire testing device in order to facilitate an examination over the entire peripheral region of the tire 3.

Figure 2:
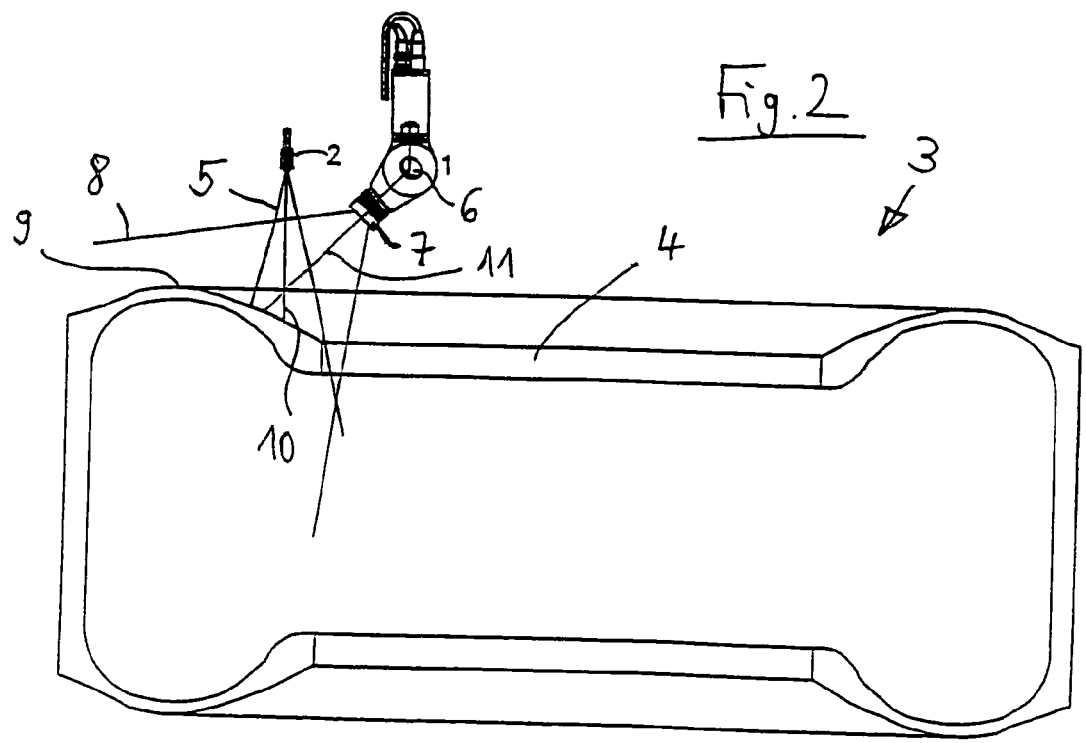
FIG. 2, a tire and a modified measuring head, in which the irradiating direction differs from the exposure direction.

In the embodiment according to FIG. 2, the laser light source 2 is spaced apart from the camera that contains the CCD sensor 6 and the lens system 7. Consequently, the irradiating direction 10 in the center of the radiation cone 5 differs from the exposure direction 11 in the center of the exposure cone 8.

The embodiment according to FIG. 3 is provided with two measuring heads 1, 1' that otherwise correspond to those used in the embodiment shown in FIG. 1. The measuring heads 1 and 1' lie opposite of one another such that they scan regions of the lateral surface 9 of the tire 3 which are offset by 180°. This means that the tire 3 only needs to be turned about its vertical center axis by 180° in order to examine the entire lateral surface 9.

The embodiment according to FIG. 4 is also provided with two measuring heads 1, 1' of the type shown in FIG. 2, wherein these measuring heads are offset relative to one another by 180° as in the embodiment according to FIG. 3.

Figure 5:
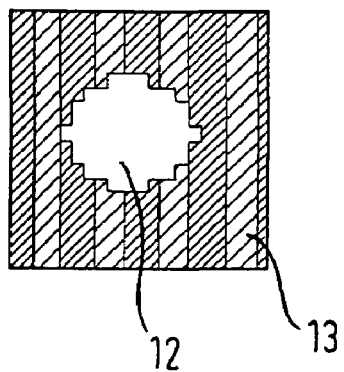
FIG. 5, a first image produced with a first adjustment, particularly a camera adjustment, that is adapted to a first image region.

In the method for the interference measurement of the lateral surface 9 of the tire 3, the lateral surface 9 is irradiated with laser light emitted by the radiation sources 2 and 2', respectively. The light reflected by the lateral surface 9 of the tire 3 is picked up by the CCD sensors 6 and 6', respectively. A first image according to FIG. 5 is initially produced with a first camera adjustment. This image is produced with a high amplification. The central image region 12 is overexposed and does not provide any sensible measuring information. The amplification of the CCD sensor is adapted to the outer image region 13, for which sensible measuring information can be obtained.

Figure 6:
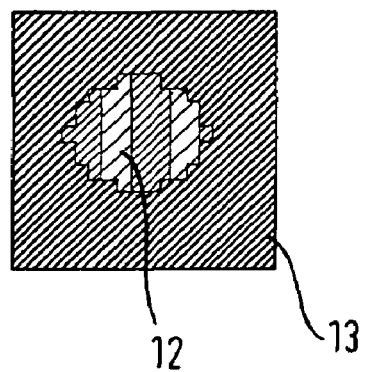
FIG. 6, a second image produced with a second adjustment, particularly a camera adjustment, that is adapted to a second, remaining image region.

A second image according to FIG. 6 is then produced. This image is produced with a reduced amplification of the CCD sensor 6. This amplification is adapted to the central image region 12 and makes it possible to obtain sensible measuring information for this central image region 12. The outer image region 13 appears underexposed and consequently does not provide any sensible measuring information.

Figure 7:
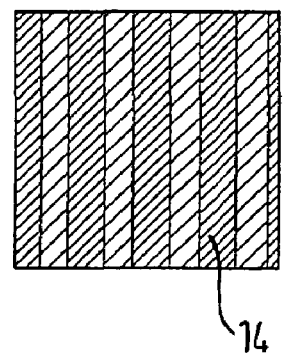
FIG. 7, a image (complete image) consisting of the combined or assembled first and second images (partial images)

The first image according to FIG. 5 and the second image according to FIG. 6 are then combined with one another. This results in the entire image region (complete image) that is illustrated in FIG. 7 and contains sensible measuring information within the entire image region 14.

FIG. 8 shows a section of an aircraft component that consists of a composite material, wherein the section to be examined is illustrated in the form of a rectangle. The section is initially irradiated by the radiation source 1.3 arranged above the left side of the section. The first image 1.9 produced contains an overexposed region 1.5 and an underexposed region 1.7. Meaningful measuring values are obtained in the region 1.1.

The section of the component to be examined is subsequently illuminated by the other radiation source 1.4 arranged above the right side of the section. The second image 1.10 produced contains an overexposed region 1.6 and an underexposed region 1.8. Meaningful measuring values are obtained in the region 1.2.

The first image 1.9 and the second image 1.10 are then combined into a complete image 1.11. The entire region of the complete image 1.11 contains meaningful measuring values. In the image 1.9, the regions 1.5 and 1.7 that do not provide any meaningful measuring values lie on the left side of the vertical center line. In the image 1.10, the regions 1.6 and 1.8 that do not provide any meaningful measuring values lie on the right side of the center line. The illumination of the section to be examined from different directions makes it possible to obtain a complete image that contains only valid measuring values. The object is illuminated from different directions as shown. The variation of the illuminating direction can be achieved by arranging several radiation sources at different locations. In the described embodiment, the radiation sources 1.3 and 1.4 are situated on the left side and on the right side of the object. However, it would also be conceivable to utilize a radiation source that can be moved or displaced to different locations. Several images 1.9, 1.10 are produced and combined into a complete image 1.11 that is optimized with respect to overexposed and underexposed regions, respectively.

The section of the component to be examined is also illustrated in the form of a rectangle in FIG. 9. In this case, said section is illuminated with different luminous intensities. The luminous intensity of the radiation source 2 is initially adjusted to a low value. The image 2.1 produced on the sensor 1 provides meaningful measuring values in the central region 2.3 and is underexposed in the marginal regions 2.4. When the second image 2.2 is produced, the actuator is set from the lower value 2.7 to the higher value 2.8 such that the radiation source 2 now has a higher luminous intensity for producing the second image 2.2. This image is overexposed in the central region 2.5 and provides meaningful measuring values in the outer region 2.6. Meaningful measuring values in the entire image region can be obtained by combining the two images 2.1 and 2.2. The luminous intensity can be varied with the aid of a filter.

In the embodiment shown in FIG. 10, the object is illuminated with a different number of light sources. The entire region of the tire to be examined is also illustrated in the form of a rectangle in this case. The device comprises three light sources 31, 32, 33 that are spaced apart from one longitudinal side of the section and arranged above the section parallel to said longitudinal side. The sensor 1 is situated on the opposite side of the section to be examined. Only the two outer light sources 31 and 33 are switched on when the first image 3.6 is produced. In this image, meaningful measuring values are obtained in the central region 3.3 while the marginal regions 3.4 are underexposed.

All three light sources 31, 32, 33 are switched on when the second image 3.1 is produced. The central region 3.5 is now overexposed while meaningful measuring values are obtained in the remainder of the image. After the images 3.6 and 3.1 are combined, an image is obtained that contains meaningful measuring values in the entire image region. The light sources 31, 32, 33 may also differ with respect to other parameters, for example, the power and/or the divergence, in order to additionally improve the result.

FIG. 11 shows a flowchart for optimizing the parameters for the different images. After starting the optimization in step 21, the parameters are initialized, a first image is produced and the corresponding evaluation values are determined in step 22. New parameters are determined and adjusted, another image is produced and the corresponding evaluation values are determined in step 23. It is then checked in step 24 whether the evaluation values are optimal or not. If this is not the case, step 23 is carried out again. If the evaluation values are optimal, the optimal parameters are adjusted in step 25. It is then checked in step 26 whether additional parameters need to be adapted or not. If this is the case, step 23 is carried out again. Otherwise, the parameter optimization ends in step 27.

The following criteria may be used for changing the camera parameters (exposure parameters) and/or the radiation source parameters (illumination parameters), i.e., for evaluating each change of a parameter with respect to the resulting brightness or brightening of an underexposed region or the darkening of an overexposed region, respectively:

the position of the output signal delivered by the sensor within the sensor characteristic; when using a CCD sensor, the average gray scale value delivered should lie in the linear region of the sensor characteristic;

when utilizing a phase-shift method, the differences between gray scale values that result from a phase shift by 180° and the contrast values determined with the phase image calculation can be maximized;

the overexposed image regions and pixels can be minimized.

In order to determine the optimal camera adjustments (exposure adjustments) and/or radiation source adjustments (illumination adjustments), the adjustments can be successively optimized for the individual image regions. In interferometric methods, two or three adjustments usually suffice for this purpose, namely a dark adjustment, a bright adjustment and, if so required, a medium adjustment. However, it is also possible to utilize an arbitrary number of adjustments.

The respective adjustments can be determined manually by means of a visual evaluation or based on the aforementioned criteria. However, it is sensible in most instances to automatically adapt the adjustments to the respectively examined object surfaces or object surface regions with the aid of an optimizing algorithm.

For this purpose, default values can be defined, in particular, based on the aforementioned criteria. Different images can be produced and evaluated with respect to different default values by iteratively changing the individual camera parameters (exposure parameters) and/or radiation source parameters (illumination parameters) until an optimum is reached. This means that evaluation values can be determined for each image and compared with the default value until the evaluation values largely correspond to the default values. In this case, it is possible to change all parameters simultaneously. However, it is advantageous in most instances to optimize the parameters successively.

In addition, it is possible to cycle all possible values of the individual parameters systematically during the optimization. However, it is more sensible in most instances to determine the respectively next parameter value based on the evaluation values determined for an individual image and their comparison with the default values. This makes it possible to determine optimal parameter values as quickly as possible. Known optimizing algorithms may be utilized for this purpose.

The invention proposes a method, in which several individual measurements are combined, if so required, with consideration of additional quality criteria of the individual pixels of the individual images. The individual images can be produced with different camera adjustments (amplification, diaphragm, shutter speed, etc.), namely such that they are respectively optimized for the individual image regions in the camera's field of view. For example, high amplification values may be used for achieving an optimal input signal in dark image regions and low amplification values may be used for highly reflective and consequently bright image regions, if so required, in combination with a reduced exposure time.

The individual images preferably are produced with different parameters, particularly camera parameters, in the most rapid succession possible in order to describe approximately identical states of deformation. If the individual states of deformation are calculated with the temporal or spatial phase-shift method, the calculated contrast image may be used as a criterion for the quality of the individual pixels. The combination of the deformation information obtained with different parameters or camera parameters may be realized in different ways, for example, by means of a weighted averaging of the individual information per pixel based on a quality criterion or by choosing the individual contribution of higher or the highest quality.

Interfering overexposed regions occur, in particular, when a significant portion of the light for illuminating the object or the tire is reflected in the direction of incidence and then projected on the imaging sensor or CCD sensor, respectively. If the light source or light sources are suitably arranged such that they are spaced apart from the imaging sensor or CCD sensor by a pronounced lateral distance and the exposure direction decidedly differs from the illuminating direction, such a direct reflection back to the sensor can be reduced or even entirely eliminated and the undesirable effect of overexposed image regions can be diminished or prevented. This makes it possible to render the arrangement less sensitive to deformations in the direction of the surface normal of the object and more sensitive to in-plane deformations (i.e., deformations in the direction of the object surface).

The invention claimed is:

1. A method for the contour measurement and/or deformation measurement of an object, comprising:
    irradiating one of an entire object at once or otherwise sequentially irradiating parts of said object with structured light that is emitted by a radiation source and is coherent light or partially coherent light,
    picking up the light reflected by the object by a camera with an imaging sensor, and
    producing a first image, including at least one overexposed and/or underexposed region associated with said first image and a region including meaningful data associated with said first image, with a first adjustment of one or more camera operating parameters of amplification, diaphragm opening, shutter speed, and/or one or more additional operating parameters of the camera and/or with a first adjustment of the luminous intensity of the radiation source which is adapted to a first image region of a first part of said object or said entire object,
    producing a second image, including at least one further overexposed and/or underexposed region associated with said second image and a region including meaningful data associated with said second image, with a second adjustment of the camera and/or the radiation source which is adapted to a second image region of said first part of said object or said entire object,
    wherein the at least one overexposed and/or underexposed region associated with said first image corresponds to said region including meaningful data associated with said second image, and
    wherein the at least one further overexposed and/or underexposed region associated with said second image corresponds to said region including meaningful data associated with said first image; and
    combining both first and second images, both of said images respectively providing information per pixel to provide a composite image containing measurable contour and/or deformation information about both the first and second image regions of said first part, and
    repeating said producing steps for further parts of said object until said entire object is irradiated.

2. The method according to claim 1 wherein, the images are combined by averaging the information per pixel, and the averaging is carried out based on a quality criterion.

3. The method according to claim 1, wherein the images are combined by selecting the information of higher quality.

4. The method according to claim 1, wherein several images are respectively produced with the first adjustment and the second adjustment.

5. The method according to claim 4, wherein an average value is formed from the images produced with the first and/or second and/or additional adjustments.

6. The method according to claim 1, wherein the method is carried out in a first state of the object (3) and subsequently in a second state of the object (3), in which the object is deformed in comparison with the first state.

7. The method according to claim 6, wherein a difference is formed between the images produced in different states of the object (3).

8. The method according to claim 1, wherein an irradiating direction (10, 10') differs from an exposure direction (11, 11').

9. The method according to claim 1, wherein one or more adjustments of the camera and/or the radiation source are determined manually.

10. The method according to claim 1, wherein one or more adjustments of the camera and/or the radiation source are determined by an optimizing algorithm.

11. The method according to claim 1, wherein one or more adjustments of the camera and/or the radiation source are determined by means of iterative changes.

12. The method according to claim 1, wherein the object is irradiated from different directions.

13. A method for the contour measurement and/or deformation measurement of an object (3), comprising:
    irradiating the object (3) with structured light that is emitted by a radiation source and is coherent light (5) or partially coherent light,
    picking up the light reflected by the object (3) by a camera with an imaging sensor (6),
    producing a first image with a first adjustment of the camera and/or the radiation source which is adapted to a first image region (13),
    producing a second image with a second adjustment of the camera and/or the radiation source which is adapted to a second image region (12), and
    combining both first and second images, both of said images respectively providing meaningful measuring values per pixel in both the first and second images to facilitate said contour measurement and/or said deformation measurement,
    wherein the object is irradiated with different luminous intensities.

14. The method according to claim 1, wherein the object is irradiated with a different number of light sources (1, 2, 3).

15. A device for the contour measurement and/or deformation measurement of an object (3), with a radiation source (2) for irradiating the entire object (3) at once or otherwise sequentially irradiating parts comprising said object with structured light wherein the light is coherent light (5) or partially coherent light, and with a camera that contains an imaging sensor (6) for picking up the light reflected by the object (3), wherein the irradiation of said parts is performed without overlap, the device comprising:

means for producing a first image with a first adjustment of the camera and/or the radiation source which is adapted to a first image region (13) of a given part of said object, said first image including at least one overexposed and/or underexposed region associated with said first image and a region including meaningful data associated with said first image, and means for producing a second image with a second adjustment of the camera and/or the radiation source which is adapted to a second image region (12) of said given part of said object, said second image including at least one overexposed and/or underexposed region associated with said second image and a region including meaningful data associated with said second image, wherein the at least one overexposed and/or underexposed region associated with said first image corresponds to said region including meaningful data associated with said second image, and wherein the at least one further overexposed and/or underexposed region associated with said second image corresponds to said region including meaningful data associated with said first image; and a device for combining both images, both of said images respectively providing information per pixel.

16. A device for the contour measurement and/or deformation measurement of an object (3), with a radiation source (2) for irradiating the entire object (3) at once or sequentially irradiating parts comprising said object with structured light wherein the light is coherent light (5) or partially coherent light, and with a camera that contains an imaging sensor (6) for picking up the light reflected by the object (3), wherein the irradiation of said parts is performed without overlap, the device comprising:

means for producing a first image with a first adjustment of the camera and/or the radiation source which is adapted to a first image region (13) of a given part of said object or said entire object, said first image including at least one overexposed and/or underexposed region associated with said first image and a region including meaningful data associated with said first image, and means for producing a second image with a second adjustment of the camera and/or the radiation source which is adapted to a second image region (12) of said given part of said object or said entire object, said second image including at least one overexposed and/or underexposed region associated with said second image and a region including meaningful data associated with said second image, wherein the at least one overexposed and/or underexposed region associated with said first image corresponds to said region including meaningful data associated with said second image, and wherein the at least one further overexposed and/or underexposed region associated with said second image corresponds to said region including meaningful data associated with said first image; and a device for combining both images, both of said images respectively providing information per pixel and the device for combining the two images comprises a device for averaging the information per pixel, wherein the averaging is carried out based on a quality criterion.

17. A device for the contour measurement and/or deformation measurement of an object (3), with a radiation source (2) for irradiating the entire object (3) at once or otherwise sequentially irradiating parts of said object with structured light wherein the light is coherent light (5) or partially coherent light, and with a camera that contains an imaging sensor (6) for picking up the light reflected by the object (3), wherein the irradiation of said parts is performed without overlap, the device comprising:

means for producing a first image with a first adjustment of the camera and/or the radiation source which is adapted to a first image region (13) of a given part of said object or said entire object, said first image including at least one overexposed and/or underexposed region associated with said first image and a region including meaningful data associated with said first image, and means for producing a second image with a second adjustment of the camera and/or the radiation source which is adapted to a second image region (12) of said given part of said object or said entire object, said second image including at least one overexposed and/or underexposed region associated with said second image and a region including meaningful data associated with said second image, wherein the at least one overexposed and/or underexposed region associated with said first image corresponds to said region including meaningful data associated with said second image, and wherein the at least one further overexposed and/or underexposed region associated with said second image corresponds to said region including meaningful data associated with said first image; and a device for combining both images, both of said images respectively providing information per pixel, and the device for combining the images comprises a device for selecting the information of the highest quality.

18. The device according to claim 15, wherein it has the ability to produce several images respectively with the first and second adjustments.

19. The device according to claim 16, wherein the device for combining the images comprises a device for selecting the information of the highest quality.

20. The method according to claim 2, wherein the images are combined by selecting the information of higher quality.

21. The method of claim 1 wherein the object is directly irradiated with unreflected light.

22. The method according to claim 1 wherein said adjustment of the camera comprises an adjustment to one or more of the amplification, diaphragm or shutter speed of the camera, and/or said adjustment to the radiation source comprises one or more of increasing or decreasing the number of radiation sources, changing the luminous intensity, or changing the direction in which the radiation source is oriented.

23. A method for the contour measurement and/or deformation measurement of an object (3), comprising:

irradiating the object (3) with structured light that is emitted by a radiation source and is coherent light (5) or partially coherent light, picking up the light reflected by the object (3) by a camera with an imaging sensor (6), producing a first image with a first adjustment of the camera and/or the radiation source which is adapted to a first image region (13), producing a second image with a second adjustment of the camera and/or the radiation source which is adapted to a second image region (12), and combining both first and second images, both of said images respectively providing meaningful measuring values per pixel in both the first and second images to facilitate said contour measurement and/or said deformation measurement, wherein said adjustment is made to one or more of the amplification, diaphragm or shutter speed of the camera.

24. The method of claim 22 wherein said adjustment is made to the radiation source.

25. The device of claim 15 wherein the object is directly irradiated with unreflected light.

26. The device of claim 15 wherein said adjustment of the camera comprises an adjustment to one or more of the amplification, diaphragm or shutter speed of the camera, and/or said adjustment to the radiation source comprises one or more of increasing or decreasing the number of radiation sources, changing the luminous intensity, or changing the direction in which the radiation source is oriented.

27. A device for the contour measurement and/or deformation measurement of an object (3), with a radiation source (2) for irradiating the object (3) with structured light wherein the light is coherent light (5) or partially coherent light, and with a camera that contains an imaging sensor (6) for picking up the light reflected by the object (3), comprising:

a device for producing a first image with a first adjustment of the camera and/or the radiation source which is adapted to a first image region (13) and for producing a second image with a second adjustment of the camera and/or the radiation source which is adapted to a second image region (12), and a device for combining both images, both of said images respectively providing information per pixel, wherein said adjustment is made to one or more of the amplification, diaphragm or shutter speed of the camera.

28. The device of claim 26 wherein said adjustment is made to the radiation source.

29. A method for the contour measurement and/or deformation measurement of an object (3), comprising:

irradiating the object (3) with a conical beam (5) of structured light that is emitted by a radiation source and is coherent light (5) or partially coherent light, picking up the light reflected by the object (3) by a camera with an imaging sensor (6) and exposure cone (8), producing a first image with a first adjustment of the camera and/or the radiation source which is adapted to a first image region (13), producing a second image with a second adjustment of the camera and/or the radiation source which is adapted to a second image region (12), and combining both first and second images, both of said images respectively providing information per pixel to provide a composite image containing measurable contour and/or deformation information about both the first and second image regions.

30. The method of claim 1 wherein the production of said first image comprises a meaningful measuring region providing meaningful measuring values per pixel in said region and an overexposed and underexposed region providing no meaningful measuring values per pixel.

31. The device of claim 15 wherein the production of said second image comprises a meaningful measuring region providing meaningful measuring values per pixel in said region and an overexposed and underexposed region providing no meaningful measuring values per pixel.

* * * * *